(12) United States Patent
Cho et al.

(10) Patent No.: US 10,970,678 B2
(45) Date of Patent: Apr. 6, 2021

(54) CONFERENCE INFORMATION ACCUMULATING APPARATUS, METHOD, AND COMPUTER PROGRAM PRODUCT

(71) Applicants: KABUSHIKI KAISHA TOSHIBA, Tokyo (JP); TOSHIBA SOLUTIONS CORPORATION, Kawasaki (JP)

(72) Inventors: Kenta Cho, Kawasaki Kanagawa (JP); Toshiyuki Kano, Kawasaki Kanagawa (JP)

(73) Assignees: KABUSHIKI KAISHA TOSHIBA, Tokyo (JP); TOSHIBA SOLUTIONS CORPORATION, Kawasaki (JP)

( * ) Notice: Subject to any disclaimer, the term of this patent is extended or adjusted under 35 U.S.C. 154(b) by 203 days.

(21) Appl. No.: 15/263,524

(22) Filed: Sep. 13, 2016

(65) Prior Publication Data

US 2016/0379169 A1    Dec. 29, 2016

Related U.S. Application Data

(63) Continuation of application No. PCT/JP2015/075639, filed on Sep. 9, 2015.

(30) Foreign Application Priority Data

Sep. 16, 2014  (JP) .............................. JP2014-188242

(51) Int. Cl.
  *G06Q 10/10* (2012.01)
  *G06Q 10/00* (2012.01)
  (Continued)

(52) U.S. Cl.
  CPC ......... *G06Q 10/10* (2013.01); *G06F 3/04842* (2013.01); *G06Q 10/00* (2013.01);
  (Continued)

(58) Field of Classification Search
  CPC ...... G06Q 10/10; G06Q 10/00; H04L 65/403; G10L 15/26; G06F 3/04842
  (Continued)

(56) References Cited

U.S. PATENT DOCUMENTS 8,185,587 B2 * 5/2012 Dudley .................. G06Q 10/10
                                                    709/204
8,914,452 B2 * 12/2014 Boston .................. G06F 40/295
                                                    709/206
(Continued)

FOREIGN PATENT DOCUMENTS

JP    2008-172582    7/2008
JP    2011-090566    5/2011
(Continued)

OTHER PUBLICATIONS

International Search Report for International Patent Application No. PCT/JP2015/075639 dated Oct. 20, 2015, 6 pages.
(Continued)

*Primary Examiner* — Michael Colucci
(74) *Attorney, Agent, or Firm* — Amin, Turocy & Watson, LLP (57) ABSTRACT

According to an embodiment, a conference information accumulating apparatus is for accumulating conference information. The apparatus includes a generator and a calculator. The generator is configured to generate a user interface screen either for creating minutes of a conference based on the conference information or for viewing the created minutes. The calculator is configured to calculate a correlation between a written text that is a unit in which the minutes are written and the conference information, based on a predetermined operation performed using the user interface screen by a minutes creator. The generator generates, upon detection of the conference information that is
(Continued)

correlated with the written text, the user interface screen enabling a reference to the conference information.

13 Claims, 10 Drawing Sheets

(51) Int. Cl.
    *G06F 3/0484*             (2013.01)
    *G10L 15/26*              (2006.01)
    *H04L 29/06*             (2006.01)
    *G10L 15/22*              (2006.01)
    *G06F 3/0485*            (2013.01)
    *H04L 29/08*             (2006.01)

(52) U.S. Cl.
    CPC ............ *G10L 15/26* (2013.01); *H04L 65/403* (2013.01); *G06F 3/04855* (2013.01); *G10L 2015/221* (2013.01); *H04L 67/02* (2013.01)

(58) Field of Classification Search
    USPC .......................................................... 704/235
    See application file for complete search history.

(56) References Cited

U.S. PATENT DOCUMENTS

| | | | | |
|---|---|---|---|---|
| 9,235,862 | B1* | 1/2016 | Radner | G06Q 50/01 |
| 2006/0047816 | A1* | 3/2006 | Lawton | H04L 51/04 |
| | | | | 709/227 |
| 2006/0294453 | A1* | 12/2006 | Hirata | G10L 15/26 |
| | | | | 715/203 |
| 2010/0189238 | A1* | 7/2010 | Gupta | H04M 3/56 |
| | | | | 379/202.01 |
| 2010/0228825 | A1* | 9/2010 | Hegde | G06Q 10/109 |
| | | | | 709/204 |
| 2013/0258042 | A1* | 10/2013 | Shun | H04L 67/22 |
| | | | | 348/14.08 |
| 2013/0305160 | A1* | 11/2013 | Gingras | G06F 16/285 |
| | | | | 715/738 |
| 2014/0163970 | A1* | 6/2014 | Zhan | H04M 3/56 |
| | | | | 704/201 |
| 2015/0006167 | A1* | 1/2015 | Kato | G10L 15/22 |
| | | | | 704/231 |
| 2015/0045003 | A1* | 2/2015 | Vora | H04M 1/64 |
| | | | | 455/412.2 |
| 2015/0081298 | A1* | 3/2015 | Ding | G10L 15/20 |
| | | | | 704/245 |
| 2015/0234806 | A1* | 8/2015 | Bhagwan | G06Q 10/1093 |
| | | | | 705/7.18 |
| 2015/0332673 | A1* | 11/2015 | Li | G06F 40/30 |
| | | | | 704/235 |
| 2016/0027442 | A1* | 1/2016 | Burton | G10L 15/26 |
| | | | | 704/235 |

FOREIGN PATENT DOCUMENTS

| | | |
|---|---|---|
| JP | 2011-128722 | 6/2011 |
| JP | 2013-029684 | 2/2013 |
| WO | 2005027092 | 3/2005 |

OTHER PUBLICATIONS

Written Opinion for International Patent Application No. PCT/JP2015/075639 dated Oct. 20, 2015, 4 pages.

* cited by examiner

| TIME | OPERATION TYPE | OPERATION PARAMETER | TARGET TYPE | TARGET |
|---|---|---|---|---|
| 16:42:05 | SEARCH | ACTION ITEM | UTTERANCE | LET'S NOW SUMMARIZE OUR ACTION ITEMS |
| 16:42:12 | WRITE | | MINUTES | TO DO: |
| 16:42:55 | REPLAY | | UTTERANCE | WE WILL ASK MR. YAMAMOTO TO PREPARE SLIDES |
| 16:43:09 | WRITE | | MINUTES | YAMAMOTO: PREPARE SLIDES |
| 16:43:25 | REPLAY | | UTTERANCE | WASN'T THERE ANYTHING WE SHOULD ASK MR. WATA TO DO? |
| 16:43:37 | CORRECT | WATANABE | UTTERANCE | WASN'T THERE ANYTHING WE SHOULD ASK MR. WATA TO DO? |
| 16:44:02 | REPLAY | | UTTERANCE | WASN'T IT BROCHURE PRINTING? |
| 16:44:15 | WRITE | | MINUTES | WATANABE: PRINT BROCHURES |
| 16:44:32 | REPLAY | | UTTERANCE | ABOUT FIFTY |
| 16:44:58 | WRITE | | MINUTES | FIFTY COPIES |

| UTTERANCE | MINUTES |
|---|---|
| LET'S NOW SUMMARIZE OUR ACTION ITEMS | TO DO: |
| WE WILL ASK MR. YAMAMOTO TO PREPAIR SLIDES | YAMAMOTO: PREPARE SLIDES |
| WASN'T THERE ANYTHING WE SHOULD ASK MR. WATANABE TO DO? WASN'T IT BROCHURE PRINTING? | WATANABE: PRINT BROCHURES |
| ABOUT FIFTY | FIFTY COPIES |

MINUTES ⟋120

CONFERENCE NAME
TIME AND DATE
PLACE
ATTENDEES

AGENDA ITEM 1

AGENDA ITEM 2

DECISIONS MADE

CONFERENCE INFORMATION ACCUMULATING APPARATUS, METHOD, AND COMPUTER PROGRAM PRODUCT

CROSS-REFERENCE TO RELATED APPLICATION

This application is a continuation of PCT international application Ser. No. PCT/JP2015/075639 filed on Sep. 9, 2015, and which claims the benefit of priority from Japanese Patent Application No. 2014-188242, filed on Sep. 16, 2014; the entire contents of which are incorporated herein by reference.

FIELD

Embodiments described herein relate generally to a conference information accumulating apparatus, a method, and a computer program product.

BACKGROUND

There has been an apparatus for accumulating various types of conference-related information (hereinafter, referred to as conference information), such as the voice of utterances made during a conference, the results of applying voice recognition to such utterances, materials used in the conference, and information written on the whiteboard. Also known is a technology for assisting the creation of minutes of a conference by providing a user interface (UI) for creating the minutes.

The minutes created based on such conference information is a brief summary giving an outline of the conference, and, therefore, a text written in the minutes does not always match the corresponding conference information, such as the corresponding utterance made during the conference, used as a reference in creating the minutes. Therefore, there are many situations in which it is not quite possible to uniquely determine the conference information with which a text included in the minutes has a correlation, and there has been a demand for a mechanism for enabling such a correlation to be clearly recognized.

DETAILED DESCRIPTION

According to an embodiment, a conference information accumulating apparatus is for accumulating conference information. The apparatus includes a generator and a calculator. The generator is configured to generate a user interface screen either for creating minutes of a conference based on the conference information or for viewing the created minutes. The calculator is configured to calculate a correlation between a written text that is a unit in which the minutes are written and the conference information, based on a predetermined operation performed using the user interface screen by a minutes creator. The generator generates, upon detection of the conference information that is correlated with the written text, the user interface screen enabling a reference to the conference information.

A conference information accumulating apparatus, a method, and a computer program according to one embodiment will now be explained in detail with reference to some drawings. Explained below in the embodiment is an example in which the utterances made during a conference are used as an example of conference information. Utterances are recorded as utterance data for each conference, and are accumulated in the conference information accumulating apparatus in a manner mapped with information for identifying the conference, such as a conference name. The conference information accumulating apparatus is implemented as a server device in a server-client system using a network, for example, and provides a service such as displaying an UI screen to be described later to a client, and performing a process based on an operation performed using the UI screen. The conference information accumulating apparatus may be a virtual machine operating in a cloud system.

Figure 1:
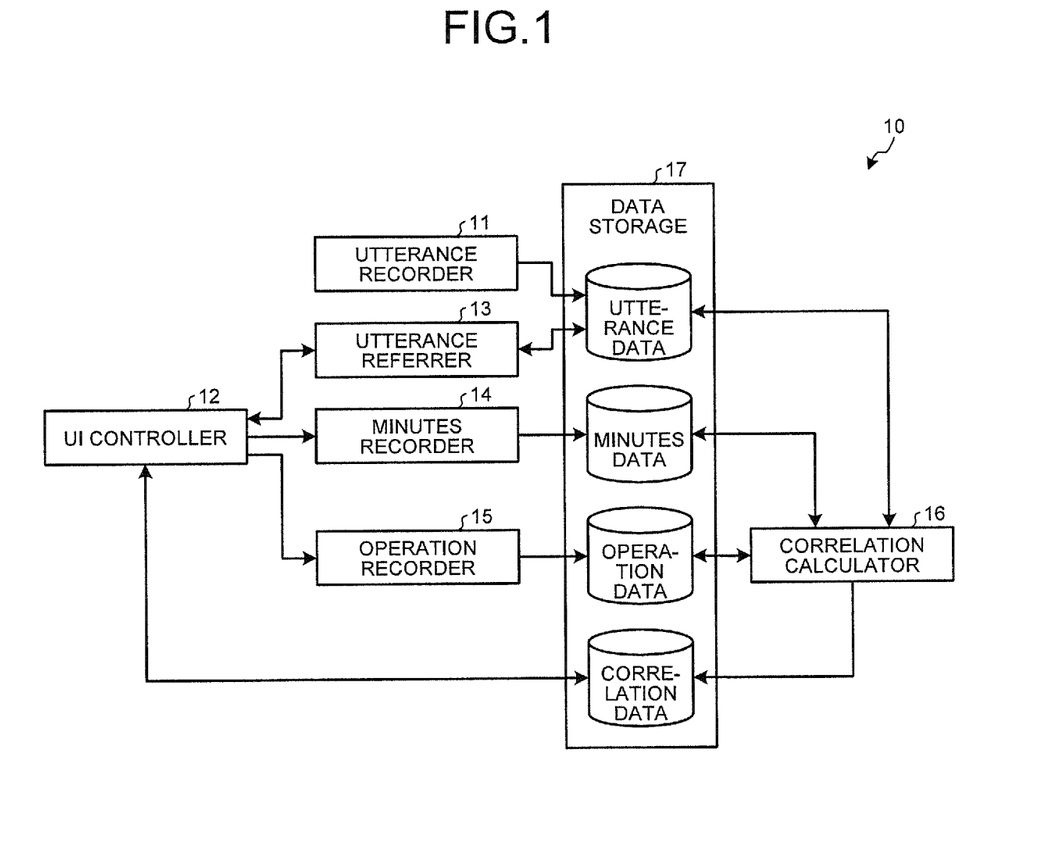
FIG. 1 is a block diagram illustrating an exemplary configuration of a conference information accumulating apparatus according to an embodiment.

FIG. 1 is a block diagram illustrating an exemplary configuration of a conference information accumulating apparatus 10 according to the embodiment. This conference information accumulating apparatus 10 includes an utterance recorder 11, a UI controller 12 (generator, an utterance referrer 13, a minutes recorder 14, an operation recorder 15, a correlation calculator 16 (calculator), and a data storage 17.

The utterance recorder 11 records the utterances made during a conference, as utterance data. The utterance data includes the voice of the utterances, an utterance text resultant of applying voice recognition to the voice, the time spoken, and the speaker data (information for identifying the speaker such as a user name).

The voice of an utterance is collected by a pin microphone attached to, or a microphone on a headset worn by each participant in the conference, and the voice as well as the time spoken and the speaker data are transmitted to the conference information accumulating apparatus 10. The utterance recorder 11 records the received utterance voice, time spoken, and speaker data to the data storage 17. The utterance recorder 11 also performs a voice recognition process of the received utterance voice, and records the utterance text resultant of the recognition in the data storage 17. It is also possible for the time spoken and the speaker data to be assigned in the conference information accumulating apparatus 10. The utterance data for each conference is accumulated independently in the data storage 17.

The UI controller 12 generates a UI screen for creating minutes of the conference based on the utterance data or for viewing the created minutes, and provides the UI screen to the client. In the embodiment, editions of the created minutes are also considered as creation of the minutes. In other words, the creation of minutes in the embodiment is a concept including newly creating minutes and editing the created minutes.

When the correlation calculator 16 to be described later detects an utterance made during the conference as being correlated with a written text, which is a unit in which the minutes are written, the UI controller 12 generates a UI screen from which the utterance correlated with the written text can be referred, and provides the UI screen to the client. In other words, the UI controller 12 generates a UI screen that is dynamically updated in response to a process performed by the correlation calculator 16, and provides the UI screen to the client.

The UI controller 12 is implemented as a web server generating a Web-based UI screen, for example, and provides the UI screen to a client. In such a configuration, a client creating or viewing the minutes uses the UI screen generated by the UI controller 12 over the network, using a web browser. A specific exemplary configuration of the UI screen will be described later in detail.

The utterance referrer 13 acquires the utterance data designated via an operation of the client made on the UI screen from the data storage 17, and passes the utterance data to the UI controller 12.

The minutes recorder 14 records a text of the minutes written by the client (minutes creator) in the UI screen (written text) to the data storage 17 as minutes data. The minutes data for each conference is accumulated independently in the data storage 17.

The operation recorder 15 records a predetermined operation made by the client (minutes creator) using the UI screen in the data storage 17, as operation data. The predetermined operation herein means predetermined operations such as an operation of writing a written text in the UI screen, an operation of replaying a specific utterance voice, an operation of correcting the utterance text corresponding to a specific utterance, and an operation of displaying a specific utterance in the UI screen. The operation data for each conference is accumulated independently in the data storage 17. A specific example of the operation data will be described later in detail.

The correlation calculator 16 calculates a correlation between a written text, which is recorded as minutes data, and an utterance recorded as utterance data during the conference, based on the operation data recorded in the data storage 17. The correlation calculator 16 then records the information of the pair of the written text and the utterance calculated as highly correlated, that is, information representing which written text in the minutes is correlated with which utterance, in the data storage 17, as the correlation data. The UI controller 12 described above can update the UI screen displayed on the client by referring to the correlation data recorded in the data storage 17, for example. A specific example of a process performed by the correlation calculator 16 will be described later in detail.

Figure 2:
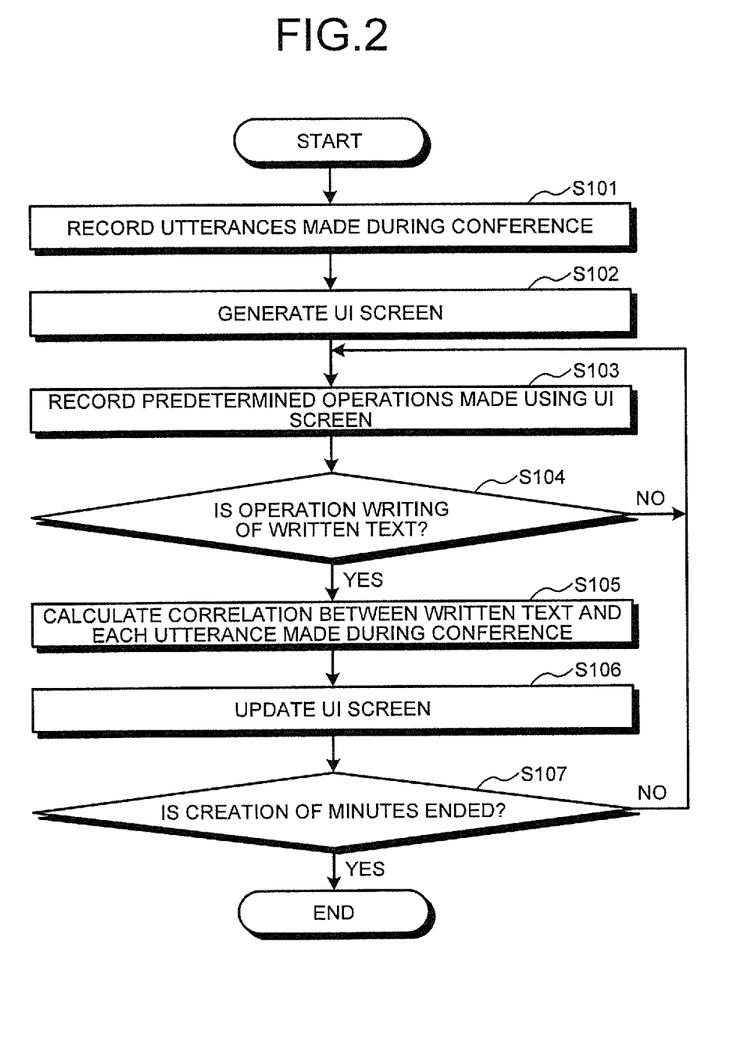
FIG. 2 is a flowchart outlining an operation of the conference information accumulating apparatus according to the embodiment.

An operation of the conference information accumulating apparatus 10 according to the embodiment will now be explained. FIG. 2 is a flowchart outlining an operation of the conference information accumulating apparatus 10 according to the embodiment. This flowchart illustrated in FIG. 2 represents an operation of the conference information accumulating apparatus 10 in a situation in which a minutes creator creates minutes after the conference has been finished.

Once the conference is started, the utterance recorder 11 records the utterances made during the conference as utterance data (Step S101). The utterance data for each conference is independently recorded.

When the minutes creator issues a request for creating the minutes to the conference information accumulating apparatus 10 after the conference is finished, by designating a conference name or the like on a terminal (client), the UI controller 12 generates a UI screen for creating minutes in response to the request (Step S102). The minutes creator can use the UI screen on the terminal, via a web browser, for example. In other words, the UI screen generated by the UI controller 12 is displayed on the terminal used by the minutes creator. The minutes creator creates the minutes using the UI screen displayed on the terminal.

Every time a predetermined operation described above is performed while the minutes creator is creating the minutes using the UI screen, the operation recorder 15 records the operation as operation data (Step S103). At this time, a determination is made as to whether the operation recorded as the operation data is an operation of writing a written text, which is a unit in which the minutes are written (Step S104). If the predetermined operation is not the operation of writing a written text (No at Step S104), the process is returned to Step S103. If the predetermined operation is an operation of writing a written text (Yes at Step S104), the correlation calculator 16 calculates a correlation between the written text and each of the utterances made during the conference based on the operation data recorded between the previous writing and this writing. When a highly correlated utterance is detected, the pair of the written text and the utterance is recorded as the correlation data (Step S105).

Once the correlation calculator 16 detects an utterance that is correlated with the written text, the UI controller 12 generates a UI screen from which the utterance correlated with the written text can be referred, and updates the UI screen displayed on the terminal being used by the minutes creator (Step S106). The process at Step S103 and thereafter is repeated until the minutes creator issues an instruction of ending the minutes creation (No at Step S107). Once the instruction of ending the minutes creation is given by the minutes creator (Yes at Step S107), this entire process is ended.

An operation of the conference information accumulating apparatus 10 according to the embodiment will now be explained in detail, with reference to some specific examples.

Figure 3:
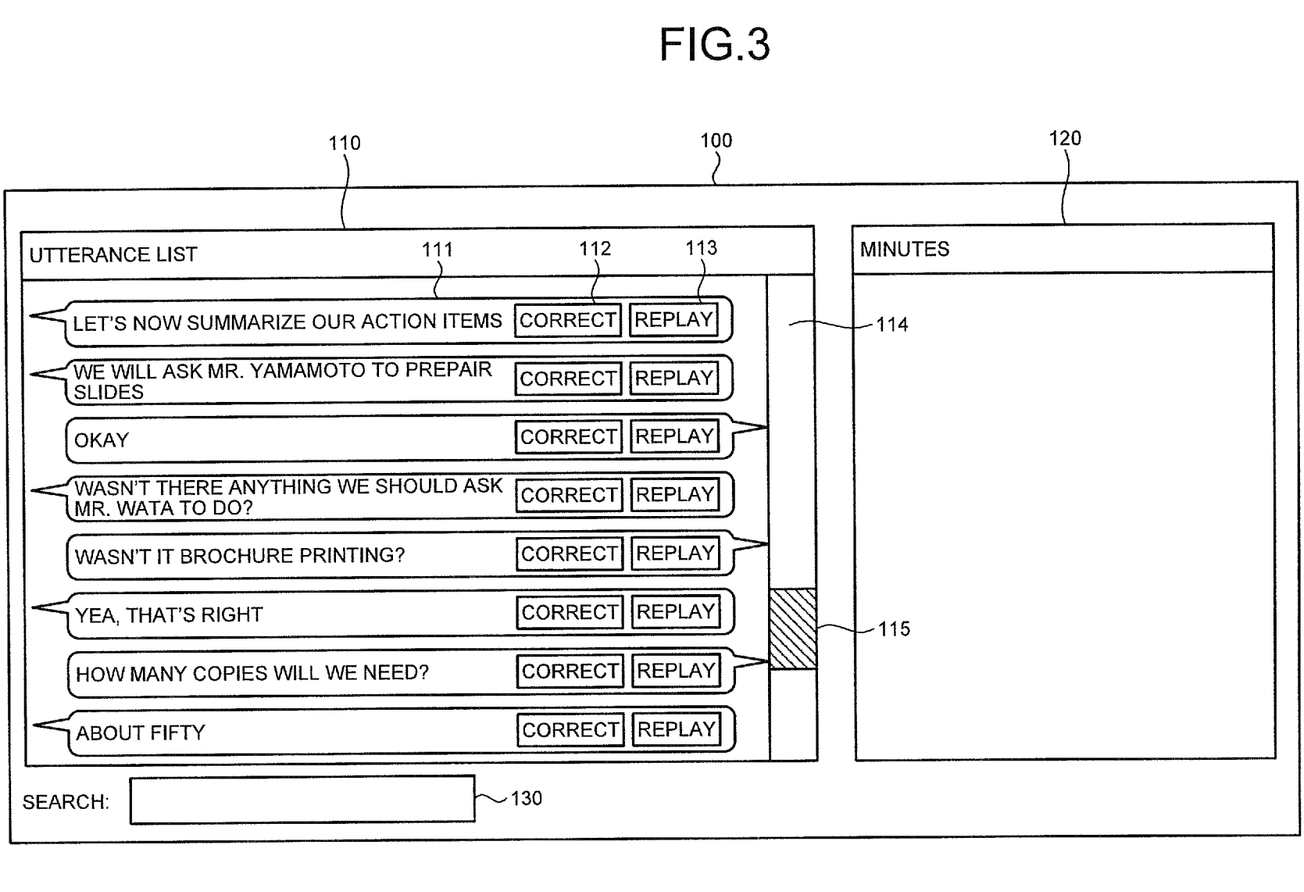
FIG. 3 is a schematic illustrating an exemplary UI screen generated by a UI controller in response to a request for creating minutes.

FIG. 3 is a schematic illustrating an exemplary UI screen generated by the UI controller 12 in response to a request for creating minutes. This UI screen 100 illustrated in FIG. 3 includes an utterance list view 110 (first area) for referring to a list of utterances, and a minutes view 120 (second area) for creating minutes.

Displayed in the utterance list view 110 is a list of utterance items 111 each representing an individual utterance, which is made during the designated conference, in a balloon-like format, for example, and that are listed in the order in which such utterances are made. Each of the utterance items 111 includes an utterance text corresponding to the utterance. A "correct" button 112 (second operation button) for correcting the utterance text and a "replay" button 113 (third operation button) for replaying the voice corresponding to the utterance text are arranged in a manner mapped to this utterance text. When the "correct" button 112 is operated, the utterance text in the utterance item 111 becomes editable so that the utterance text can be corrected. When the "replay" button 113 is operated, the utterance voice is acquired from the data storage 17, transmitted to the client, and replayed on the client.

In the example illustrated in FIG. 3, the utterance items 111 corresponding to the utterances of the minutes creator are displayed inside of the balloons pointing to the left side of the screen, and the utterance items 111 corresponding to the utterances of those other than the minutes creator are displayed inside balloons pointing to the right side of the screen. The determination as to whether an utterance is that of the minutes creator can be made by matching the speaker data included in the utterance data such as the user name entered when the minutes creator issues a request for creating the minutes.

Because the size of the utterance list view 110 is limited, it is not quite possible to display the utterance items 111 corresponding to the entire utterances made during the designated conference all at once. The utterance list view 110 is therefore provided with a scroll bar 114 representing the time series of the entire utterances made during the conference, and the utterance item 111 corresponding to the utterance at the position of a knob 115 of the scroll bar 114 is displayed in the utterance list view 110. The minutes creator can then scroll the utterance list view 110 by operating the knob 115 of the scroll bar 114 so that the utterance item 111 corresponding to a desired utterance is displayed in the utterance list view 110.

A search text box 130 for searching for an utterance including a specific keyword is provided below the utterance list view 110. By entering a specific keyword in the search text box 130, the utterance list view 110 is scrolled so that the utterance item 111 corresponding to the utterance including the entered keyword is displayed at, for example, the top of the utterance list view 110. At this time, the keyword included in the utterance text of the utterance item 111 may be displayed in a highlighted manner. Alternatively, the utterance item 111 itself including the keyword may be displayed in a highlighted manner. The way in which the keyword or the utterance item 111 is displayed in a highlighted manner is not limited to a particular way, and various ways may be used to make the highlighting such as making the color or the brightness of the balloon corresponding to the utterance item 111 different, or displaying the balloon blinkingly.

The minutes view 120 is a text area for allowing the minutes creator to write a written text and to create the minutes. The minutes creator creates the minutes by writing a written text in the minutes view 120 while referring to the utterance items 111 displayed in the utterance list view 110, and by correcting the utterance text by operating the "correct" button 112 and by operating on the "replay" button 113, and replaying the voice corresponding to the utterance text as required. These operations of the minutes creator are recorded, as appropriate, as the operation data. The correlation between a written text and each utterance is then calculated based on this operation data.

Figure 4:
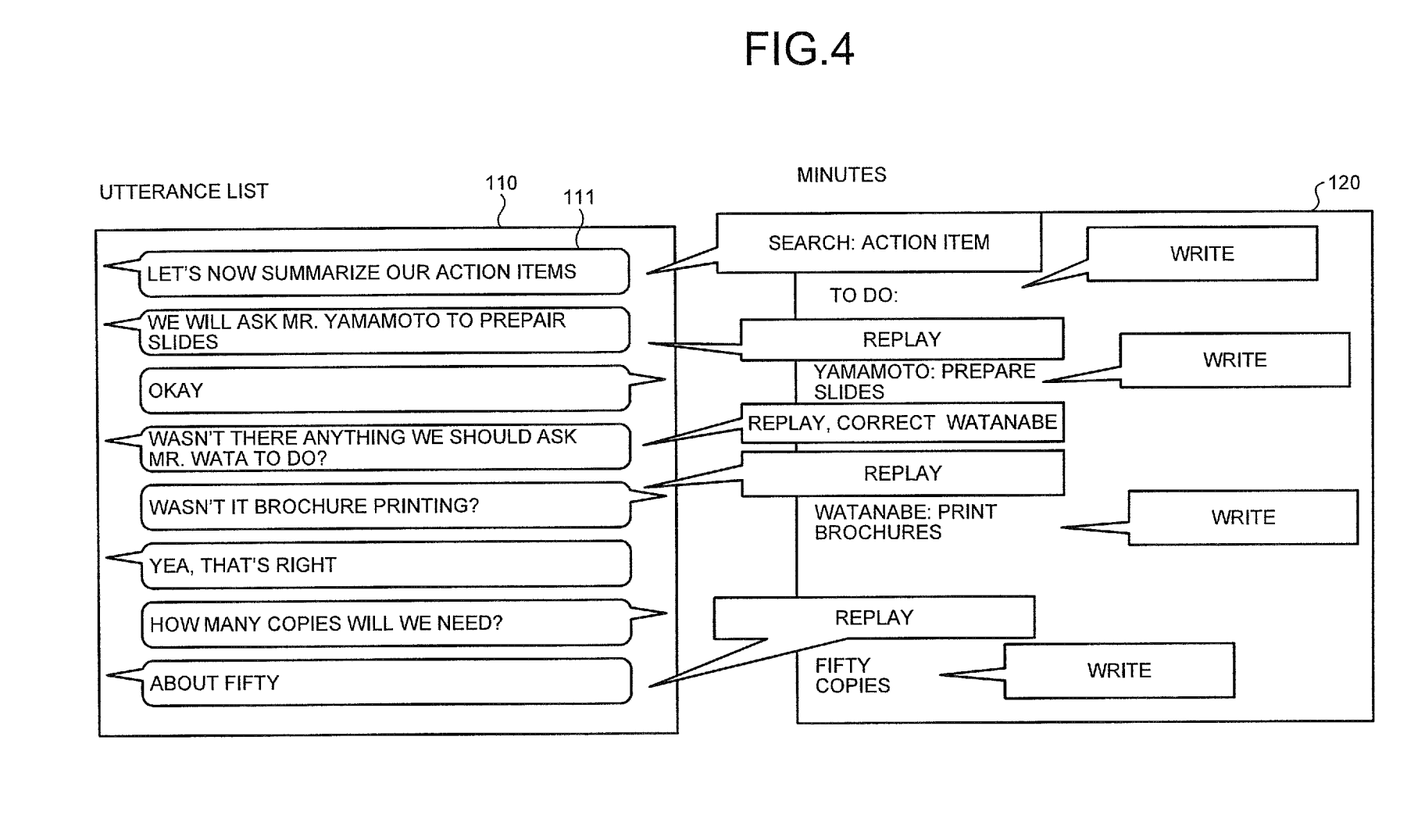
FIG. 4 is a schematic illustrating an exemplary specific operation performed when minutes are created.

FIG. 4 is a schematic illustrating an exemplary specific operation performed while the minutes are created. In FIG. 4, the "correct" button 112 and the "replay" button 113 corresponding to each of the utterance items 111, the scroll bar 114, the search text box 130, and the like displayed in the utterance list view 110 are omitted.

In the exemplary operation illustrated in FIG. 4, to begin with, the minutes creator enters a keyword "action item" to the search text box 130. The utterance list view 110 is then scrolled so that the utterance item 111 corresponding to the utterance "Let's now summarize our action items" is displayed at the top of the utterance list view 110. The minutes creator then writes a written text "To Do:" at the first line of the minutes view 120, in response to the displayed utterance.

The minutes creator then replays the voice by operating the "replay" button 113 for the utterance item 111 corresponding to the utterance "We will ask Mr. Yamamoto to prepair the slides". This utterance includes a voice recognition error in which "prepare" is represented as "prepair". The minutes creator then confirms that "prepair" is "prepare" by replaying the utterance voice, and writes a written text "Yamamoto: Prepare slides" at the second line in the minutes view 120.

The minutes creator then replays the voice by operating the "replay" button 113 for the utterance item 111 corresponding to the utterance "Wasn't there anything we should ask Mr. Wata to do?". This utterance also includes a voice recognition error in which "Mr. Watanabe" is represented as "Mr. Wata". The minutes creator then makes an operation of correcting the error by operating on the "correct" button 112. The minutes creator replays the voice by operating the "replay" button 113 for the utterance item 111 corresponding to the next utterance "Wasn't it brochure printing?", listens to the replayed voice, and writes a written text "Watanabe: Print brochures" at the third line of the minutes view 120.

The minutes creator then finally replays the voice by operating the "replay" button 113 for the utterance item 111 corresponding to the utterance "about fifty", listens to the replayed voice, and writes a written text "fifty copies" at the fourth line of the minutes view 120.

Figure 5:
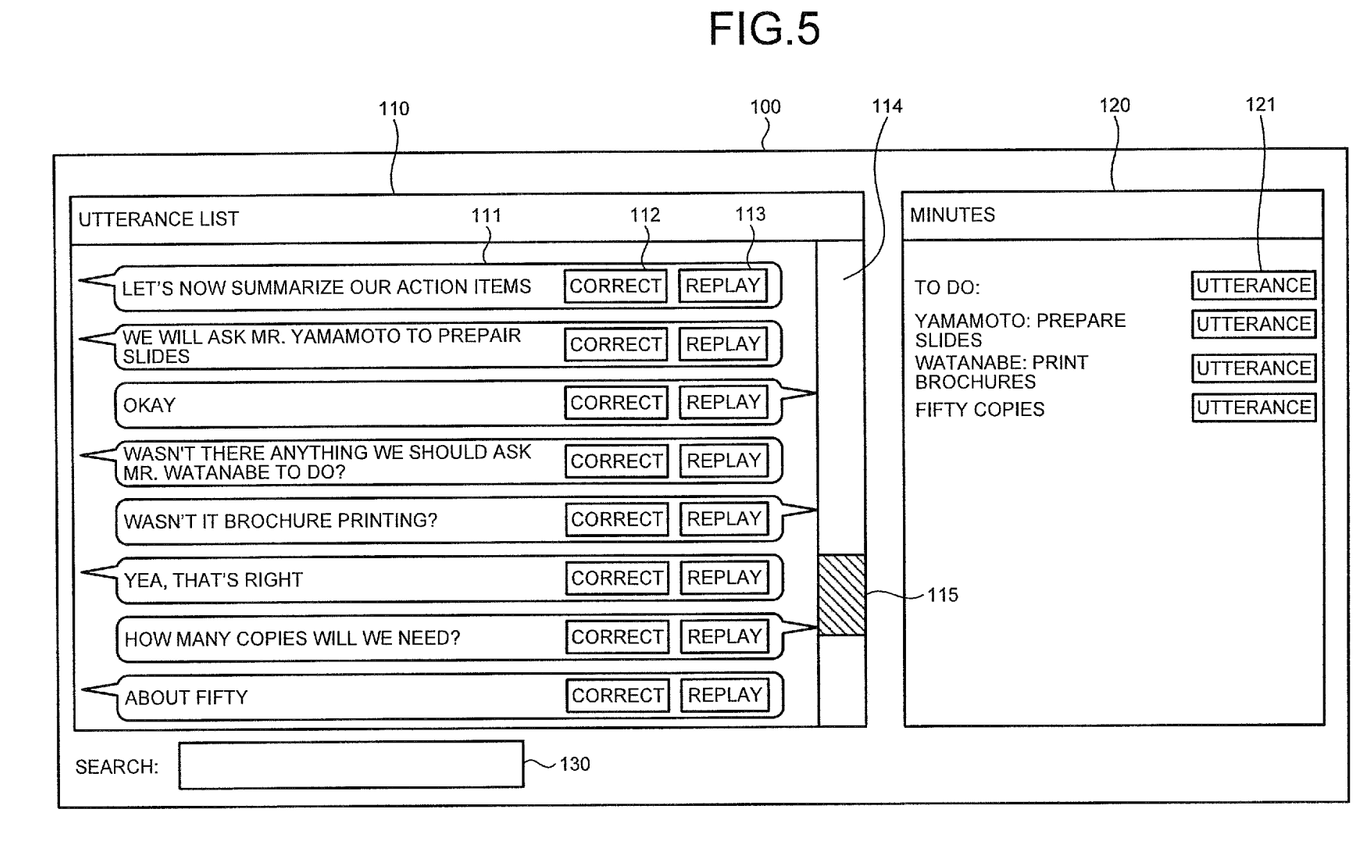
FIG. 5 is a schematic illustrating an exemplary UI screen from which an utterance correlated with a written text can be referred.

FIG. 5 is a schematic illustrating an example of the UI screen 100 generated by the UI controller 12 after the operation described above is performed, and is a schematic illustrating an example of the UI screen 100 from which an utterance correlated with a written text can be referred. Compared with the example illustrated in FIG. 3, the UI screen 100 illustrated in FIG. 5 is different in that "utterance" buttons 121 (first operation buttons) are disposed on the minutes view 120.

In the conference information accumulating apparatus 10 according to the embodiment, once the minutes creator writes a written text in the manner described above, the correlation calculator 16 calculates a correlation between the written text and each of the utterances, and detects the utterance that is correlated with the written text. Once an utterance correlated with the written text is detected, the UI controller 12 generates the UI screen 100 in which the "utterance" button 121 is positioned in the minutes view 120 in a manner mapped with the written text for which the correlated utterance is detected, as illustrated in FIG. 5, for example. In the UI screen 100 illustrated in FIG. 5, the "utterance" button 121 is arranged in a manner mapped with each of the written texts "TO DO:", "Yamamoto: Prepare slides", "Watanabe: Print brochures", and "50 copies".

The "utterance" button 121 is a button for referring to the utterance correlated with the written text. When this "utterance" button 121 is operated, the utterance item 111 corresponding to the utterance correlated with the written text is displayed in the utterance list view 110. For example, the utterance list view 110 is scrolled so that the utterance item 111 corresponding to the utterance correlated with the written text mapped with the operated "utterance" button 121 is displayed at the center of the utterance list view 110. At this time, if there are a plurality of utterances correlated with the written text mapped with the operated "utterance" button 121, the utterance list view 110 is scrolled so that the utterance item 111 corresponding to the most highly correlated utterance is displayed at the center of the utterance list view 110.

The utterance item 111 corresponding to the utterance correlated with the written text that is mapped to the operated "utterance" button 121 may be displayed in a highlighted manner in the utterance list view 110. The way in which the utterance item 111 is highlighted is not limited to a particular way, and various ways may be used to make the highlighting such as making the color or the brightness of the balloon corresponding to the utterance item 111 different, or displaying the balloon blinkingly.

Described above is an example in which the UI screen 100 is generated by the UI controller 12 when minutes are created, but the UI screen 100 with the minutes view 120 in which the "utterance" button 121 is arranged in a manner mapped with the written text for which the correlated utterance is detected is also generated when minutes having already been created are viewed, in the same manner as the example illustrated in FIG. 5. A user who is viewing the minutes can display the utterance item 111 corresponding to the utterance that is correlated with a written text in the utterance list view 110, and refer to the utterance by operating the "utterance" button 121 arranged in the minutes view 120.

Figure 6:
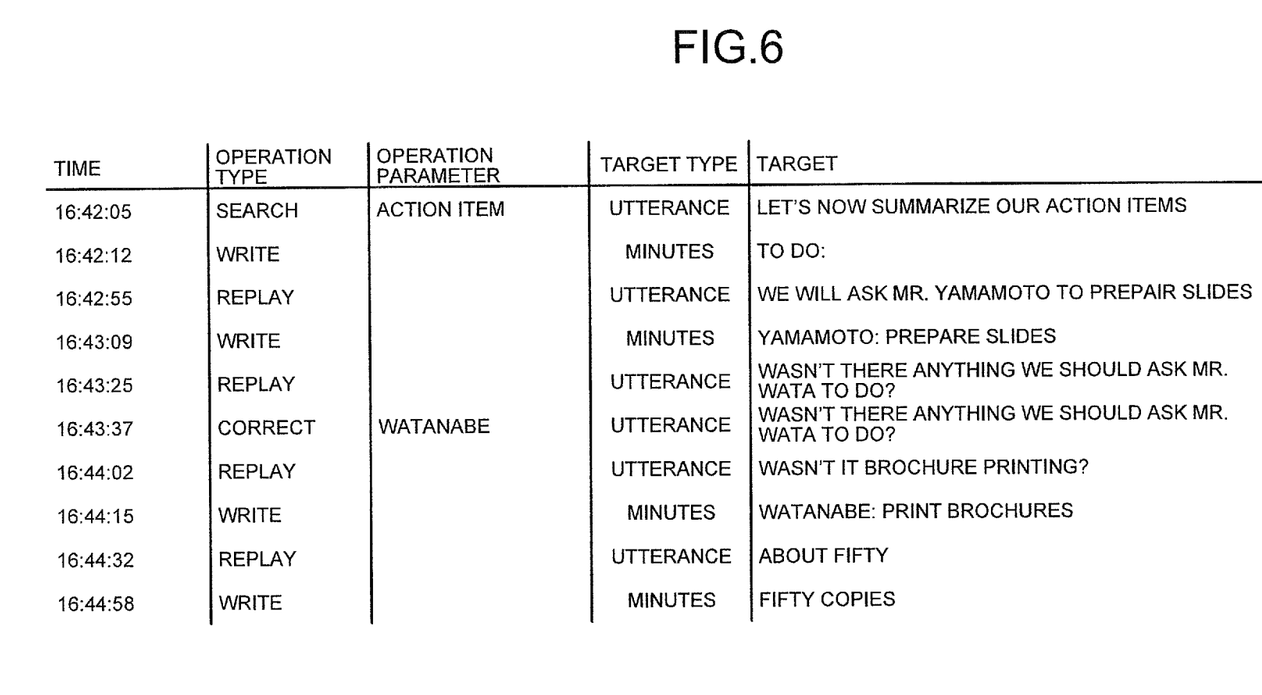
FIG. 6 is a schematic illustrating exemplary operation data.

A correlation between a written text and an utterance in the minutes is calculated by the correlation calculator 16 based on the predetermined operation recorded as the operation data in the data storage 17 by the operation recorder 15, as described earlier. FIG. 6 is a schematic illustrating exemplary operation data recorded in the data storage 17, and illustrates operation data corresponding to the specific operation example illustrated in FIG. 4.

The operation data includes the attribute "time", "operation type", "operation parameter", "target type", and "target" as illustrated in FIG. 6, for example. The "time" represents the time at which the operation is performed. The "operation type" represents a specific type of the operation such as search, write, replay, and correct. The "operation type" may include a scrolling operation of the utterance list view 110 performed to refer to a specific utterance, as mentioned earlier. When used is an UI screen provided with a function for transferring the specific utterance displayed in the utterance list view 110 into the minutes view 120, a transfer operation may be included in the "operation type". The "operation parameter" is text data representing the details of a specific operation such as a keyword used in a search, and a corrected character string when the operation is a correction. The "target type" represents whether the operation is performed to an utterance or minutes. The "target" represents the utterance or the written text of the minutes to which the operation is made.

Figure 7:
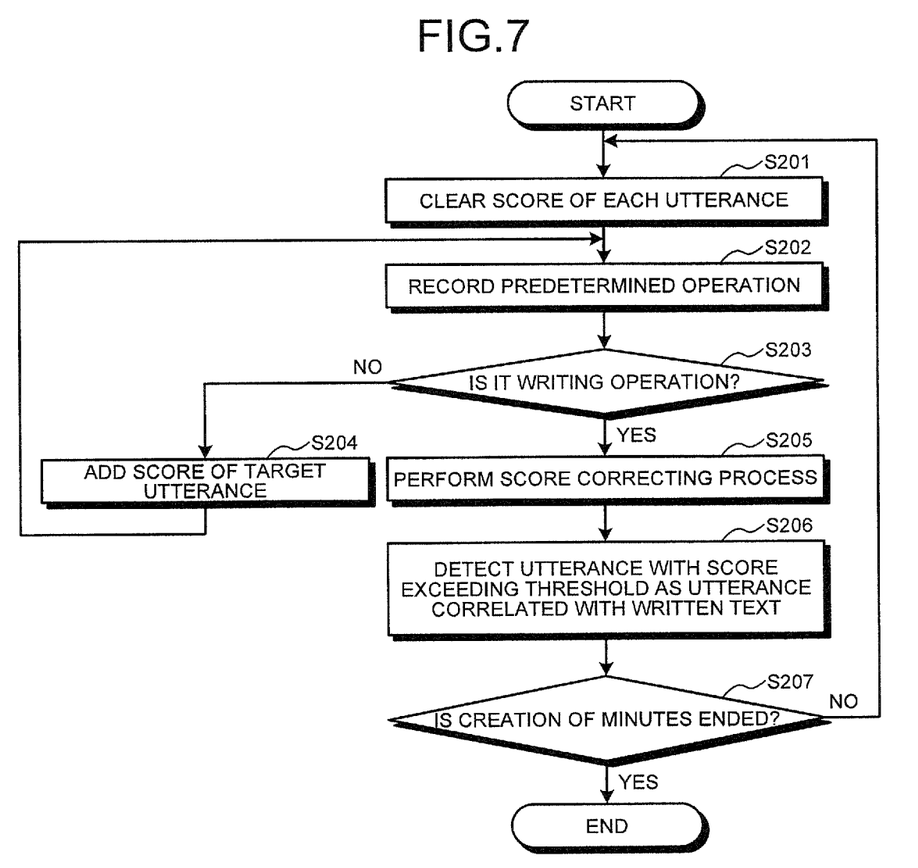
FIG. 7 is a flowchart illustrating an exemplary process of calculating a correlation between a written text and an utterance.

FIG. 7 is a flowchart illustrating an exemplary process of calculating a correlation between a written text and an utterance. The entire process illustrated in FIG. 7 is started when the UI screen 100 is generated by the UI controller 12 in response to a request from the minutes creator.

Once the process is started, to begin with, the correlation calculator 16 clears the score assigned to each of the utterances made in the designated conference (Step S201). A score is a value representing the correlation between the utterance and a specific written text in the minutes.

When the minutes creator performs a predetermined operation using the UI screen 100, the operation recorder 15 records the predetermined operation (Step S202). At this time, the correlation calculator 16 determines whether the predetermined operation performed by the minutes creator is a write operation of a written text in the minutes view 120 (Step S203). If the predetermined operation is not a write operation (No at Step S203), the correlation calculator 16 adds a score to the utterance which is the target of the operation (Step S204), and the process is returned to Step S202. A different score may be added to the utterance depending on the type of operation.

On the other hand, if the predetermined operation performed by the minutes creator is a write operation (Yes at Step S203), the correlation calculator 16 performs a process of correcting the score of all of the utterances (Step S205). For example, the correlation calculator 16 adds a score to the utterance with an utterance text that is highly similar to a written text. At this time, the correlation calculator 16 may add a higher score to an utterance text with a written text having a higher similarity, or add a constant score to each of the utterance texts having similarities exceeding a reference value. An operation performed to the utterance to which the score is added at Step S204 may be stored, and a score may be added when the operation parameter of this operation and the written text is highly similar.

The correlation calculator 16 also subtracts the score of the utterance that is temporally distant from the utterance with the highest score. At this time, the correlation calculator 16 may subtract a higher score if the utterance is at a larger temporal distance, or subtract a constant score for all of the utterances with temporal distances exceeding a reference value. It is also possible for the correlation calculator 16 to store the operation performed on the utterance to which a score is added at Step S204, and to subtract the score of the utterance having a largest distance between the time at which the operation is performed and at which the written text is written.

Figure 8:
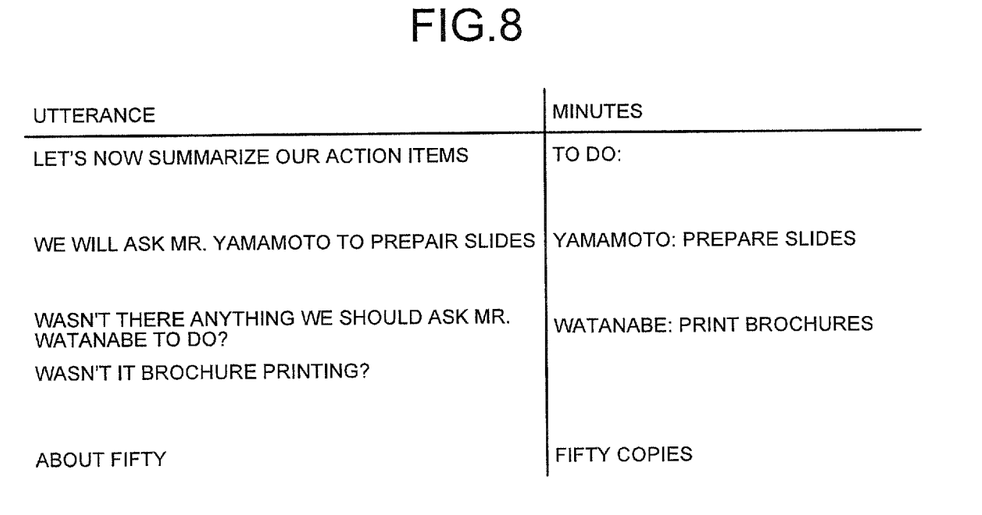
FIG. 8 is a schematic illustrating exemplary correlation data.

After correcting the score in the manner described above, the correlation calculator 16 detects the utterance with a score exceeding a predetermined threshold as an utterance correlated with a written text, by referring to the score of each of the utterances, records the pair of the correlated written text and utterance as the correlation data (Step S206). An example of the correlation data is illustrated in FIG. 8. The correlation data illustrated in FIG. 8 corresponds to the specific operation example illustrated in FIG. 4, and pairs of a written text in the minutes and the utterance correlated thereto are recorded in the correlation data. The UI controller 12 generates the UI screen 100 an example of which is illustrated in FIG. 5 by referring to this correlation data.

A determination is then made as to whether an operation for ending the creation of the minutes, such as an operation of closing the UI screen 100, is performed by the minutes creator (Step S207). If any operation for ending the creation of the minutes is not performed (No at Step S207), the process is returned to Step S201, and the subsequent process is repeated. In other words, detection of the predetermined operation and a calculation of the correlation between a written text and each of the utterances are continued until the creation of the minutes is ended. If an operation for ending the creation of the minutes is performed (Yes at Step S207), this entire process illustrated in FIG. 7 is ended.

Explained above is an example in which the minutes are created after the conference is ended, but the minutes may also be created, using the UI screen 100 described above, while the conference is in progress. In such a case, every time the utterance item 111 is generated for an utterance during the conference, the newly generated utterance item 111 is added to the utterance list view 110 in the UI screen 100. The minutes creator then writes a written text in the minutes view 120 by referring to the utterance list view 110. Once the written text is written in the minutes view 120, the correlation calculator 16 calculates a correlation between the written text and each of the utterances by performing the same process described above.

At this time, in the score correcting process described above, it is preferable for the correlation calculator 16 to add the score to an utterance corresponding to the utterance item 111 displayed in the utterance list view 110 while a written text is being written. For example, the correlation calculator 16 adds a higher score to an utterance with time spoken (the time at which the utterance is made) that is temporarily nearer to the time at which the written text is written. This is because, when the minutes are created while the conference is still in progress, it is likely for the minutes creator to write the content of the utterance having been made immediately previously to the minutes.

Figure 9:
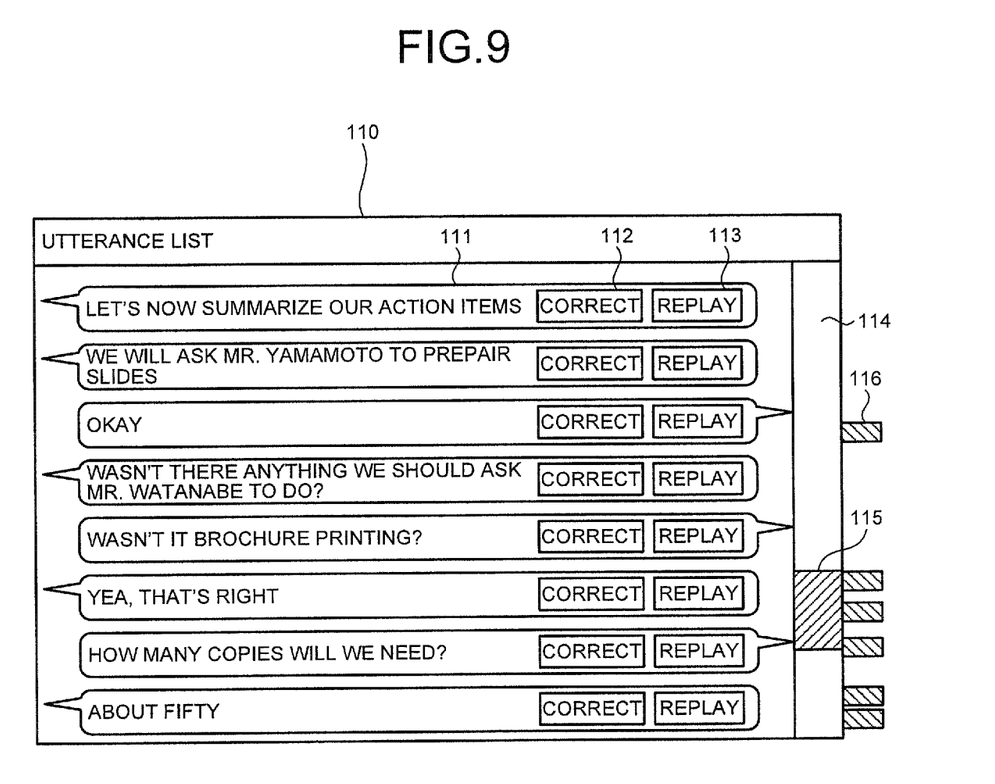
FIG. 9 is a schematic illustrating another exemplary configuration of the UI screen.

The configuration of the UI screen 100 described above is merely an example, various modifications are still possible. For example, as illustrated in FIG. 9, a mark 116 representing the position of an utterance detected as the utterance correlated with a written text written in the minutes may be displayed in a manner mapped to the time series of the utterances made during the conference and represented as the scroll bar 114. In such a configuration, the minutes creator can display the utterance item 111 corresponding to the utterance at the mark 116 in the utterance list view 110 by moving the knob 115 of the scroll bar 114 and scrolling the utterance list view 110 to the position of a desired mark 116. In this manner, the user can look for an important utterance correlated with a written text in the minutes, with a simple operation. Furthermore, in this configuration, the utterance item 111 corresponding to the utterance at the mark 116 may be displayed in a highlighted manner in the utterance list view 110.

Figure 10:
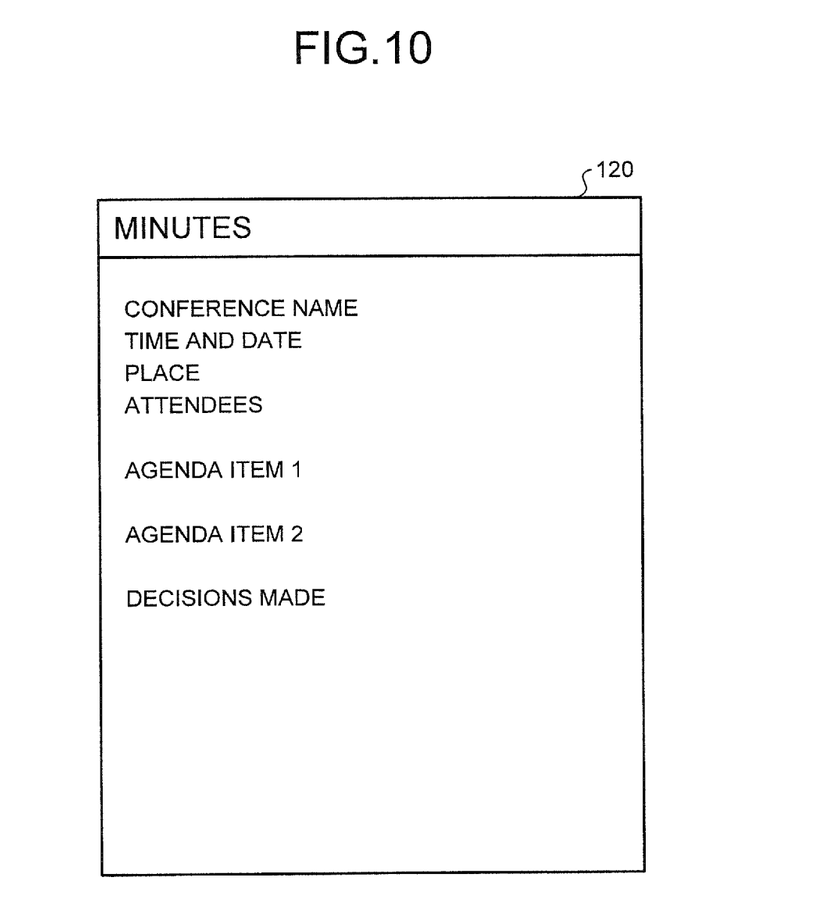
FIG. 10 is a schematic illustrating an exemplary minutes template.

It is also possible to have a minutes template to be prepared in advance, and to apply the template in the initial view of the minutes view 120, as illustrated in FIG. 10. The template illustrated as an example in FIG. 10 is provided with a part for writing information related to the conference, such as "conference name", "time and date", "place", and "attendees", and a part for writing specific agenda items such as "agenda item 1", "agenda item 2", and "decisions made". The minutes creator can use an item such as the "agenda item 1" or the "agenda item 2" by rewriting it with the actual name of the agenda item, for example.

The items such as the "agenda item 1", the "agenda item 2", and the "decisions made" included in the template may be used as a section break in the minutes. In other words, the conference information accumulating apparatus 10 can accumulate the written texts (minutes data) included in the minutes in units of a section in the data storage 17, using the positions of these items as a reference, and identify the utterance correlated with a written text in units of a section. Even when the template is not provided with the items such as the "agenda item 1", the "agenda item 2", and the "decisions made", the conference information accumulating apparatus 10 may recognize a section break in the minutes by establishing a rule, such as entering a predetermined symbol at the head of a section, in advance.

Figure 11:
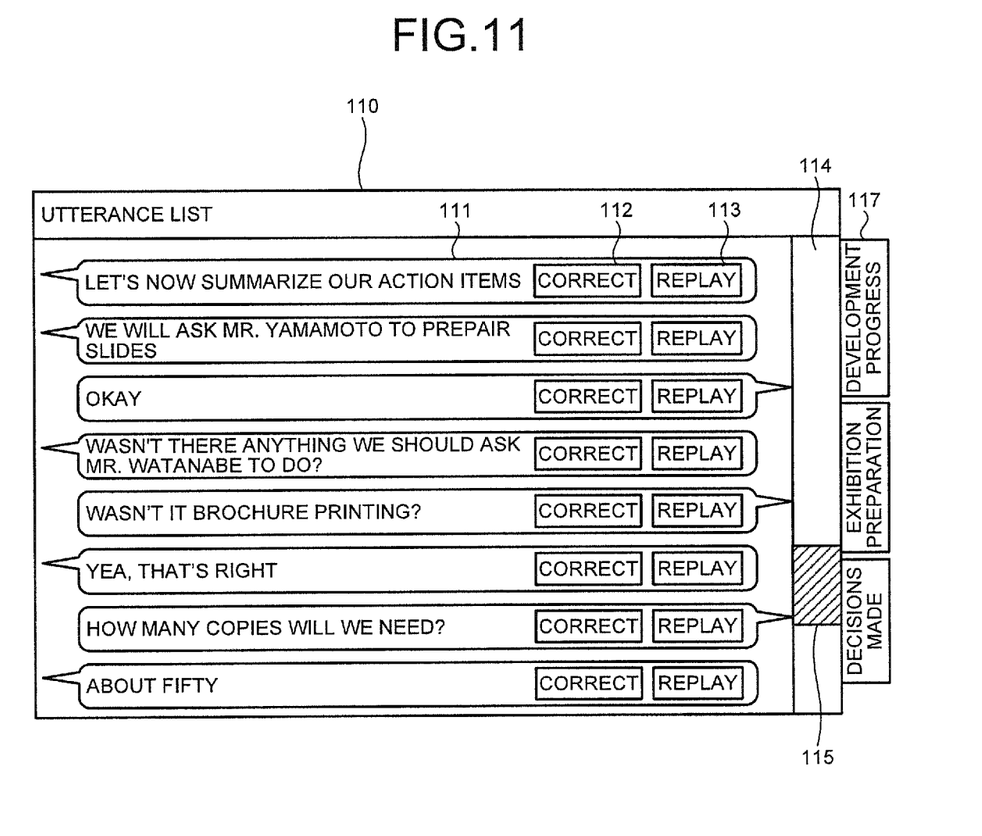
FIG. 11 is a schematic illustrating another exemplary configuration of the UI screen.

The name of each item to be used as a section break may be used as index information corresponding to each section in the minutes, and displayed in a manner mapped to the utterance correlated with a written text in the section. For example, as illustrated in FIG. 11, index information 117 is displayed in a manner mapped to the time series of the utterances made during the conference and represented by the scroll bar 114. Illustrated in FIG. 11 is an example in which the "agenda item 1" included in the template illustrated in FIG. 10 is rewritten with "Development Progress", and the "agenda item 2" is rewritten with "Exhibition Preparation". In this configuration, the minutes creator can display the utterance item 111 corresponding to an utterance within the section at the position of the index information 117 in the utterance list view 110 by moving the knob 115 of the scroll bar 114 and scrolling the utterance list view 110 to the position of the desired index information 117. In this manner, the user can look for an utterance correlated with a desired section in the minutes with a simple operation.

As described above with reference to some specific examples, the conference information accumulating apparatus 10 according to the embodiment calculates a correlation between a written text, which is a unit in which minutes are written, and an utterance made during the conference based on a predetermined operation performed using the UI screen 100 by a minutes creator, and generates, when an utterance correlated with a written text is detected, the UI screen 100 from which the minutes creator can refer to the utterance. Therefore, the conference information accumulating apparatus 10 can present a correlation between an utterance and a written text in the minutes created based on the utterances made during the conference, and enables a user to properly recognize the utterance based on which the written text is written.

In the embodiment explained above is an example in which the minutes is created based on the utterances made during the conference, but the same process can be used in an example in which the minutes are created based on another type of conference information such as materials used in the conference or the information written on the whiteboard, for example. For example, the UI controller 12 may generate the UI screen 100 including an area for displaying a list of items such as the materials used in the conference and the information written on the whiteboard in replacement of, or in addition to the utterance list view 110 described above. An operation for allowing the minutes creator to select a desired item from the area and to view the information is then established as a predetermined operation, and a correlation between the written text and the conference material is calculated, in the same manner as that described above. When a conference material correlated with the written text is detected, the UI controller 12 generates the UI screen 100 from which the conference material can be referred.

Supplemental Explanations

The functional elements included in the conference information accumulating apparatus 10 according to the embodiment explained above is implemented as a computer program (software) executed using a general-purpose computer system as basic hardware, for example.

Figure 12:
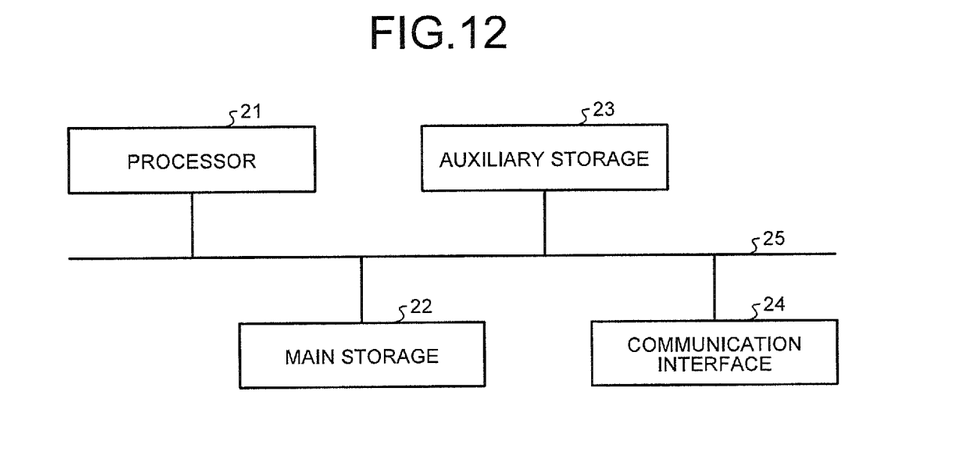
FIG. 12 is a block diagram schematically illustrating an exemplary hardware configuration of the conference information accumulating apparatus according to the embodiment.

FIG. 12 is a block diagram schematically illustrating an exemplary hardware configuration of the conference information accumulating apparatus 10. The conference information accumulating apparatus 10 according to the embodiment is implemented as a general-purpose computer system including a processor 21 such as a central processing unit (CPU), a main storage 22 such as a random access memory (RAM), an auxiliary storage 23 that uses various types of storage device, a communication interface 24, and a bus 25 connecting these units, as illustrated in FIG. 12. The auxiliary storage 23 may be connected to these units via a wired or wireless local area network (LAN), for example.

The functional elements (the utterance recorder 11, the UI controller 12, the utterance referrer 13, the minutes recorder 14, the operation recorder 15, and the correlation calculator 16) of the conference information accumulating apparatus 10 according to the embodiment are implemented by execution of a computer program stored in the auxiliary storage 23 or the like, by the processor 21 using the main storage 22, for example. The data storage 17 is implemented using the auxiliary storage 23.

The computer program executed by the processor 21 is provided as a computer program product recorded in a computer-readable recording medium such as a compact disc read-only memory (CD-ROM), a flexible disk (FD), a compact disc recordable (CD-R), and a digital versatile disc (DVD), as a file in an installable or executable format, for example.

Furthermore, this computer program may be provided by storing the computer program in another computer connected over a network such as the Internet, and making the computer program available for download over the network. Furthermore, this computer program may be provided or distributed over a network such as the Internet. Furthermore, this computer program may be provided in a manner incorporated in the ROM (the auxiliary storage 23) or the like that is provided internally to the computer.

This computer program has a modular structure including the functional elements of the conference information accumulating apparatus 10 according to the embodiment. As actual hardware, for example, the processor 21 reads the computer program from the recording medium and executes the computer program to cause the elements to be loaded onto the main storage 22 and to be generated on the main storage 22. The functional elements of the conference information accumulating apparatus 10 according to the embodiment may also be implemented, partially or entirely, using dedicated hardware such as an application specific integrated circuit (ASIC) or a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conference information accumulating apparatus for accumulating conference information, the apparatus comprising:
    a generator configured to generate a user interface screen either for creating minutes of a conference based on the conference information or for viewing the created minutes; and
    a calculator configured to detect a piece of the conference information correlated with a written text that is text written to the user interface screen by a minutes creator based on a predetermined operation targeting on the piece of the conference information including at least one of a searching of the piece of the conference information, a replaying of the piece of the conference information, and a correcting of the piece of the conference information performed using the user interface screen by the minutes creator before the written text is written to the user interface screen, wherein
    the generator generates, upon detection of the piece of the conference information that is correlated with the written text, the user interface screen enabling a reference to the piece of the conference information, the user interface screen including a first area for referring to the conference information and a second area for creating or viewing the minutes, the second area having a first operation button arranged therein with which the piece of the conference information is transformed and mapped to the written text that is summarized text of the piece of the conference information, wherein the piece of the conference information is transformed and mapped based on determining a user identity within uttered speech that is included in the conference information and an uttered action item that is uttered in near contemporaneity with the user identity, associating the uttered action item with the user identity, and transcribing, based on the uttered speech, the user identity and the uttered action item into the summarized text, and
    the generator generates, in response to an operation of the first operation button, the user interface screen in which the first area displays the piece of the conference information that is correlated with the written text.

2. The apparatus according to claim 1, wherein
    each piece of the conference information includes a voice of an utterance made during the conference and includes an utterance text resultant of applying a voice recognition process to the voice,
    the generator generates the user interface screen in which utterance items each including an utterance text and corresponding to an utterance are displayed in the first area in a manner arranged in an order of time at which such utterances are made, and
    the generator generates, in response to an operation of the first operation button, the user interface screen in which the utterance item corresponding to an utterance that is correlated with the written text is displayed in the first area.

3. The apparatus according to claim 2, wherein the generator generates, in response to an operation of the first operation button, the user interface screen in which the utterance item corresponding to an utterance that is correlated with the written text is displayed at a center of the first area.

4. The apparatus according to claim 2, wherein the generating unit is configured to generate, in response to an operation of the first operation button, the user interface screen in which the utterance item corresponding to the utterance that is correlated with the written text is displayed in the first area in an highlighted manner.

5. The apparatus according to claim 2, wherein the utterance item includes a second operation button and a third operation button, the second operation button being arranged in a manner mapped to a corresponding utterance text and being operated when the utterance text is to be corrected, the third operation button being operated when a voice corresponding to the utterance text is to be replayed.

6. The apparatus according to claim 5, wherein
the predetermined operation includes at least one of an operation for displaying the utterance item in the first area, an operation made on the second operation button mapped to the utterance item, and an operation made on the third operation button mapped to the utterance item, and
the calculator adds a score to an utterance corresponding to the utterance item for which the predetermined operation is performed before the written text is written in the second area, and detects the utterance that is correlated with the written text based on the score at a point in time at which the written text is written in the second area.

7. The apparatus according to claim 6, wherein the calculator corrects the score based on a similarity between the written text and the utterance text, and detects the utterance that is correlated with the written text based on the corrected score.

8. The apparatus according to claim 6, wherein the calculator corrects the score based on a temporal distance between time at which the predetermined operation is performed and time at which the written text is written, and detects the utterance that is correlated with the written text based on the corrected score.

9. The apparatus according to claim 6, wherein the calculator corrects the score by adding a higher score when time at which the utterance is made is temporally near time at which the written text is written, and detects the utterance that is correlated with the written text based on the corrected score.

10. The apparatus according to claim 2, wherein
the first area includes a scroll bar representing a time series of entire utterances made during the conference, the entire utterances including utterances that are not displayed as the utterance items, displayed in the first area being an utterance item for the utterance corresponding to a position of a knob of the scroll bar, and
the generator generates, upon detection of the utterance that is correlated with the written text, the user interface screen in which a position of the utterance is displayed in a manner mapped to the time series represented by the scroll bar.

11. The apparatus according to claim 2, wherein
the first area includes a scroll bar representing a time series of entire utterances made during the conference, the entire utterances including utterances that are not displayed as the utterance items, displayed in the first area being an utterance item for the utterance corresponding to a position of a knob of the scroll bar, and
the generator generates the user interface screen in which index information assigned to each section of the minutes is displayed in a manner mapped to the time series represented by the scroll bar.

12. A method executed by a conference information accumulating apparatus that accumulates conference information, the method comprising:
generating a user interface screen either for creating minutes of a conference based on the conference information or for viewing the created minutes; and
detecting a piece of the conference information correlated with a written text that is a text written to the user interface screen by a minutes creator based on a predetermined operation targeting on the piece of the conference information including at least one of a searching of the piece of the conference information, a replaying of the piece of the conference information, and a correcting of the piece of the conference information performed using the user interface screen by the minutes creator before the written text is written to the user interface screen, wherein
the generating includes generating, when the piece of the conference information correlated with the written text is detected at the detecting, the user interface screen enabling a reference to the piece of the conference information, the user interface screen including a first area for referring to the conference information and a second area for creating or viewing the minutes, the second area having a first operation button arranged therein with which the piece of the conference information is transformed and mapped to the written text that is summarized text of the piece of the conference information, wherein the piece of the conference information is transformed and mapped based on determining a user identity within uttered speech that is included in the conference information and an uttered action item that is uttered in near contemporaneity with the user identity, associating the uttered action item with the user identity, and transcribing, based on the uttered speech, the user identity and the uttered action item into the summarized text, and
the generating further includes, in response to an operation of the first operation button, generating the user interface screen in which the first area displays the piece of the conference information that is correlated with the written text.

13. A computer program product comprising a non-transitory computer-readable medium containing a program, wherein the program, when executed by a computer, causes the computer to execute:
generating a user interface screen either for creating minutes of a conference based on conference information or for viewing the created minutes; and
detecting a piece of the conference information correlated with a written text that is a text written to the user interface screen by a minutes creator based on a predetermined operation targeting on the piece of the conference information including at least one of a searching of the piece of the conference information, a replaying of the piece of the conference information, and a correcting of the piece of the conference information performed using the user interface screen by the minutes creator before the written text is written to the user interface screen, wherein
the generating includes generating, when the piece of the conference information correlated with the written text is detected at the detecting, the user interface screen enabling a reference to the piece of the conference information, the user interface screen including a first area for referring to the conference information and a second area for creating or viewing the minutes, the second area having a first operation button arranged therein with which the piece of the conference information is transformed and mapped to the written text that is summarized text of the piece of the conference information, wherein the piece of the conference information is transformed and mapped based on determining a user identity within uttered speech that is included in the conference information and an uttered action item that is uttered in near contemporaneity with the user identity, associating the uttered action item with the user identity, and transcribing, based on the uttered speech, the user identity and the uttered action item into the summarized text, and the generating further includes, in response to an operation of the first operation button, generating the user interface screen in which the first area displays the piece of the conference information that is correlated with the written text.

* * * * *